United States Patent
Schatz et al.

(10) Patent No.: US 10,871,646 B2
(45) Date of Patent: Dec. 22, 2020

(54) MICROMIRROR DEVICE AND METHOD FOR OPERATING A MICROMIRROR DEVICE

(71) Applicant: Robert Bosch GmbH, Stuttgart (DE)

(72) Inventors: Frank Schatz, Kornwestheim (DE); Helmut Grutzeck, Kusterdingen (DE); Joerg Muchow, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 16/324,616

(22) PCT Filed: Aug. 30, 2017

(86) PCT No.: PCT/EP2017/071779
§ 371 (c)(1),
(2) Date: Feb. 11, 2019

(87) PCT Pub. No.: WO2018/046374
PCT Pub. Date: Mar. 15, 2018

(65) Prior Publication Data
US 2019/0179137 A1    Jun. 13, 2019

(30) Foreign Application Priority Data
Sep. 7, 2016  (DE) .................. 10 2016 216 938

(51) Int. Cl.
*G02B 26/08* (2006.01)
*G02B 26/10* (2006.01)

(52) U.S. Cl.
CPC ......... *G02B 26/0858* (2013.01); *G02B 26/08* (2013.01); *G02B 26/0833* (2013.01); *G02B 26/101* (2013.01)

(58) Field of Classification Search
CPC ........... G02B 26/0858; G02B 26/0833; G02B 26/101; G02B 26/08
See application file for complete search history.

(56) References Cited

U.S. PATENT DOCUMENTS

2010/0296147 A1    11/2010    Terada et al.

FOREIGN PATENT DOCUMENTS

DE    102012219591 A1    4/2014
EP    2270972 A1    1/2011
(Continued)

OTHER PUBLICATIONS

International Search Report for PCT/EP2017/071779, dated Nov. 20, 2017.

*Primary Examiner* — Wen Huang
(74) *Attorney, Agent, or Firm* — Norton Rose Fulbright US LLP; Gerard Messina

(57) ABSTRACT

A micromirror device, including a substrate and an outer frame element, which is connected to the substrate along a first oscillating axis with the aid of a first suspension device, and is deflectable about the first oscillating axis. In addition, the micromirror device includes an inner frame element, which is connected to the outer frame element along the first oscillating axis with the aid of a second suspension device; as well as an oscillating plate, which includes a micromirror and is connected to the inner frame element along a second oscillating axis, with the aid of a third suspension device; the first oscillating axis being perpendicular to the second oscillating axis. The inner frame element includes displaceable deflection elements, the oscillating plate being deflectable by displacing the deflection elements relative to the outer frame element.

8 Claims, 3 Drawing Sheets

(56) References Cited

FOREIGN PATENT DOCUMENTS

| | | | |
|---|---|---|---|
| EP | 3012679 | A1 | 4/2016 |
| JP | 2013257424 | A | 12/2013 |
| JP | 2016085299 | A | 5/2016 |
| WO | 02086602 | A1 | 10/2002 |
| WO | 2005078509 | A2 | 8/2005 |

MICROMIRROR DEVICE AND METHOD FOR OPERATING A MICROMIRROR DEVICE

FIELD

The present invention relates to a micromirror device and a method for operating a micromirror device.

BACKGROUND INFORMATION

Micromirrors have various applications, for instance, in barcode scanners, in projectors or in vehicle headlights. To this end, the micromirrors are able to be deflected or swiveled about one or two axes at a high frequency. A micromirror set-up is described in German Patent Application No. DE 10 2012 219 591 A1, where a micromirror plate is suspended on a substrate by straight connecting pieces. Bending actuators, which may be set into oscillation, are fastened to the connecting piece; and in this manner, the micromirror plate is, itself, deflectable.

SUMMARY

The present invention relates to a micromirror device, and a method for operating a micromirror device.

The present invention relates to a micromirror device having a substrate, an outer frame element, an inner frame element and an oscillating plate. The outer frame element is connected to the substrate along a first oscillating axis, using a first suspension device, and is deflectable about the first oscillating axis. The inner frame element is connected to the outer frame element along the first oscillating axis, using a second suspension device. The oscillating plate includes a micromirror and is connected to the inner frame element along a second oscillating axis, using a third suspension device. The first oscillating axis is perpendicular to the second oscillating axis. The inner frame element includes displaceable deflection elements, the oscillating plate being deflectable relative to the outer frame element, by displacing the deflecting elements.

According to a further aspect, the present invention accordingly relates to a method for operating a micromirror device, where the outer frame element is deflected about the first oscillating axis and the oscillating plate is deflected relative to the outer frame device, by displacing the deflection elements.

Preferred specific embodiments of the present invention are described herein.

The present invention provides a micromirror capable of being deflected two-dimensionally. By displacing the deflection elements, the micromirror is preferably deflected about the second oscillating axis, that is, orthogonally to the connecting elements between the inner frame element and the outer frame element. The loading of the inner frame element, that is, the acting shear forces and torsional forces, turns out to be markedly less than would be the case, if the oscillating mirror were deflected about the first oscillating axis, for instance, by connecting the oscillating plate and inner frame element along the first oscillating axis. In comparison with the suspension of the inner frame element on the outer frame element, the 90°-offset suspension of the oscillating plate on the inner frame element thereby ensures a sturdy construction, in which the generated forces are reduced. The life of the micromirror device is increased markedly due to the lower deflection and thereby lower loading of, in particular, the inner frame element; the actuating time of the micromirror device simultaneously being able to be shortened.

According to a preferred further refinement of the micromirror device, the deflection elements include first deflection elements and second deflection elements; the first deflection elements being positioned on the inner frame element, symmetrically to the second oscillating axis with respect to the second deflection elements. By oppositely directed displacement of the first deflection elements relative to the second deflection elements, the oscillating plate may be set into oscillation about the second oscillating axis. The positioning of the deflection elements according to the present invention permits deflection of the oscillating plate about the second oscillating axis, in addition to deflection of the oscillating plate about the first oscillating axis; the force acting upon the micromirror device being minimized.

According to one preferred further refinement of the micromirror device, the substrate includes a cavity; the first suspension device having a first suspension element and a second suspension element, which connect the substrate to the outer frame element on opposite sides of the cavity, along the first oscillating axis. The first suspension element and the second suspension element are situated on opposite sides of the oscillating plate. Thus, the first and the second suspension element provide a suspension mount of the outer frame element, which permits deflection or rotation of the outer frame element and simultaneously decouples a motion of the inner frame element relative to the outer frame element substantially from a motion of the outer frame element alone.

According to a preferred further refinement of the micromirror device, the second suspension device has a third suspension element and a fourth suspension element, which connect the outer frame element to the inner frame element on opposite sides of the oscillating plate, along the first oscillating axis. The third and the fourth suspension elements allow movement of the inner frame element relative to the outer frame element.

According to a further refinement of the micromirror device, the third suspension device has a fifth suspension element and a sixth suspension element, which connect the inner frame element to the oscillating plate on opposite sides of the oscillating plate, along the second oscillating axis. By rotation about the fifth and the sixth suspension elements, the oscillating plate may be deflected or rotated about the second oscillating axis, relative to the inner frame element.

According to a preferred further refinement of the micromirror device, the deflection elements each have a beam element running parallel to the second oscillating axis in the undeflected state, as well as an inertial mass situated on the beam element. The inertial mass is preferably capable of being set into oscillation by an actuator of the micromirror device and transmits the oscillation through the beam element, the rest of the inner frame element, and the third suspension device, to the oscillating plate, so that this may be set into oscillation relative to the outer frame element. The masses of the deflection-element inertial masses situated on the beam elements are preferably equal.

According to a preferred further refinement of the micromirror device, the inertial mass is situated in an outer end region of the beam elements. In this manner, the moment of inertia and, therefore, the transmitted oscillation are increased.

According to a preferred further refinement of the micromirror device, the beam elements taper towards their end region. This further increases the robustness of the micromirror device, while simultaneously allowing the inertial masses to be readily deflectable.

According to a preferred further refinement of the micromirror device, the deflection elements have at least one piezoelectric layer. By applying an electric control signal, using a control device of the micromirror device, the deflection elements may be displaced in a controlled manner, and through this, the oscillating plate may be set into oscillation.

DETAILED DESCRIPTION OF EXAMPLE EMBODIMENTS

Figure 1:
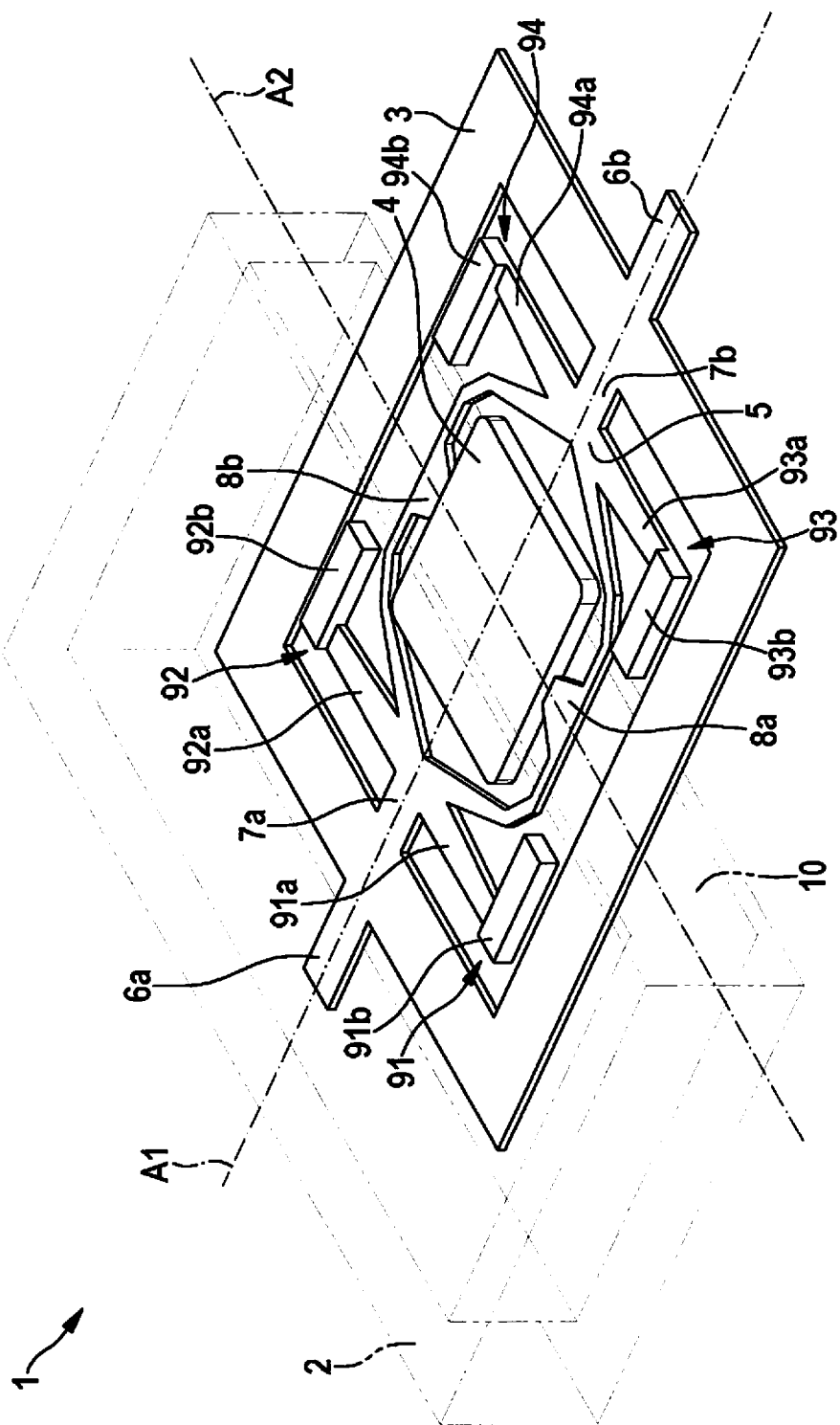
FIG. 1 shows a schematic oblique view of a micromirror device according to a specific embodiment of the present invention.

In all of the figures, like or functionally identical elements and devices are denoted by the same reference numerals. The numbering of method steps is used for the sake of clarity and shall not imply, in general, any particular chronological sequence. In particular, a plurality of method steps may also be carried out simultaneously. Different specific embodiments may be combined with each other, as desired, provided this is practical.

A schematic oblique view of a micromirror device 1 is illustrated in FIG. 1. A cavity 10 is formed in a substrate 2, which is preferably made of silicon. An outer frame element 3 is mounted to substrate 2 and connected to it along a first oscillating axis A1, with the aid of a first suspension device. The first suspension device includes a first suspension element 6a on a first side of cavity 10 and a second suspension element 6b situated on an opposite, second side of cavity 10, along first oscillating axis A1; the first and second suspension elements being able to be formed in the shape of a beam. First suspension element 6a and second suspension element 6b may swivel/twist about first axis of rotation A1, which means that outer frame element 3 is deflectable or rotatable about first oscillating axis A1.

Outer frame element 3 has the shape of a rectangle; a likewise rectangular region being made available in the interior of the rectangle. An inner frame element 5, which is connected to outer frame element 3 with the aid of a second suspension device, is situated within this available region. The second suspension device includes a third suspension element 7a and a fourth suspension element 7b situated opposite to it along first oscillating axis A1, the third and fourth suspension elements being able to be formed in the shape of a beam. Inner frame element 5 is positioned about an oscillating plate 4, in the shape of a buckle, and is connected to oscillating plate 4 by a third suspension device made up of a fifth suspension element 8a and a sixth suspension element 8b. Fifth suspension element 8a and the sixth suspension element 8b situated on an opposite side of the oscillating plate lie on a second axis of rotation A2, which is perpendicular to first axis of rotation A1, so that fifth suspension element 8a and sixth suspension element 8b are offset 90 degrees from first suspension element 6a and second suspension element 6b, as well as from third suspension element 7a and fourth suspension element 7b.

The shape of inner frame element 5 and outer frame element 3 is not limited to the specific embodiment shown. Thus, inner frame element 3 and/or outer frame element 5 may also be annular or in the shape of a four-sided or multi-sided ring.

Oscillating plate 4 includes at least one micromirror, which is configured to deflect light. Outer frame element 3, inner frame element 5 and/or oscillating plate 4 are advantageously formed in one piece.

Two first deflection elements 91, 92 and two second deflection elements 93, 94 are situated on inner frame element 5. The two first deflection elements 91, 92 are positioned axially symmetrically to each other with respect to first oscillating axis A1, and the two second deflection elements 93, 94 are also positioned axially symmetrically relative to each other, with respect to first oscillating axis A1. In combination, first deflection elements 91, 92 are positioned axially symmetrically relative to second deflection elements 93, 94, with respect to second oscillating axis A2.

Deflection elements 91 through 94 each include a beam element 91a through 94a, which is situated on inner frame element 5, adjacent to third suspension element 7a or fourth suspension element 7b, and extends parallelly to second oscillating axis A2. An inertial mass 91b through 94b, which runs preferably parallelly to first oscillating axis A1, in the shape of a beam, is situated in an outer end region of beam elements 91a through 94a, respectively.

Outer frame element 3 may be set into oscillation by a control device of micromirror device 1. In particular, outer frame element 3 may include at least one layer of a piezoelectric material and/or magnetoresistive material and/or thermal effect material and/or shape memory material. A piezoelectric material may include, in particular, lead zirconate titanate (PZT). A thermal effect material may be, for example, silicon carbide or nickel, for example. In the case of a piezoelectric material, the control device may transmit a torque to outer frame element 3 and deflect it about first oscillating axis A1 with the aid of an electrical signal, using the interaction of the at least one layer, which is used as an electrode, and a counter-electrode situated in or on a base of cavity 10 of substrate 2.

In addition, deflection elements 91 through 94 may be displaced and/or set into oscillation by the control device. Deflection elements 91 through 94 and, in particular, inertial masses 91b through 94b may include at least one layer of one of the materials mentioned above for the outer frame element. The micromirror device may include further, corresponding counter-electrodes in or on substrate 2, by which the control device may set deflection elements 91 through 94 into oscillation in a controlled manner.

Frame 3 may also be used as a coil brace. The coil may be supplied with current via suspension elements 6a, 6b. If micromirror device 1 is situated in a permanent magnetic field (e.g., using an external coil or a permanent magnet not shown here), then the system may be deflected by the electromagnetic force. In this context, the coil may preferably take the form of a planar coil.

Figure 2:
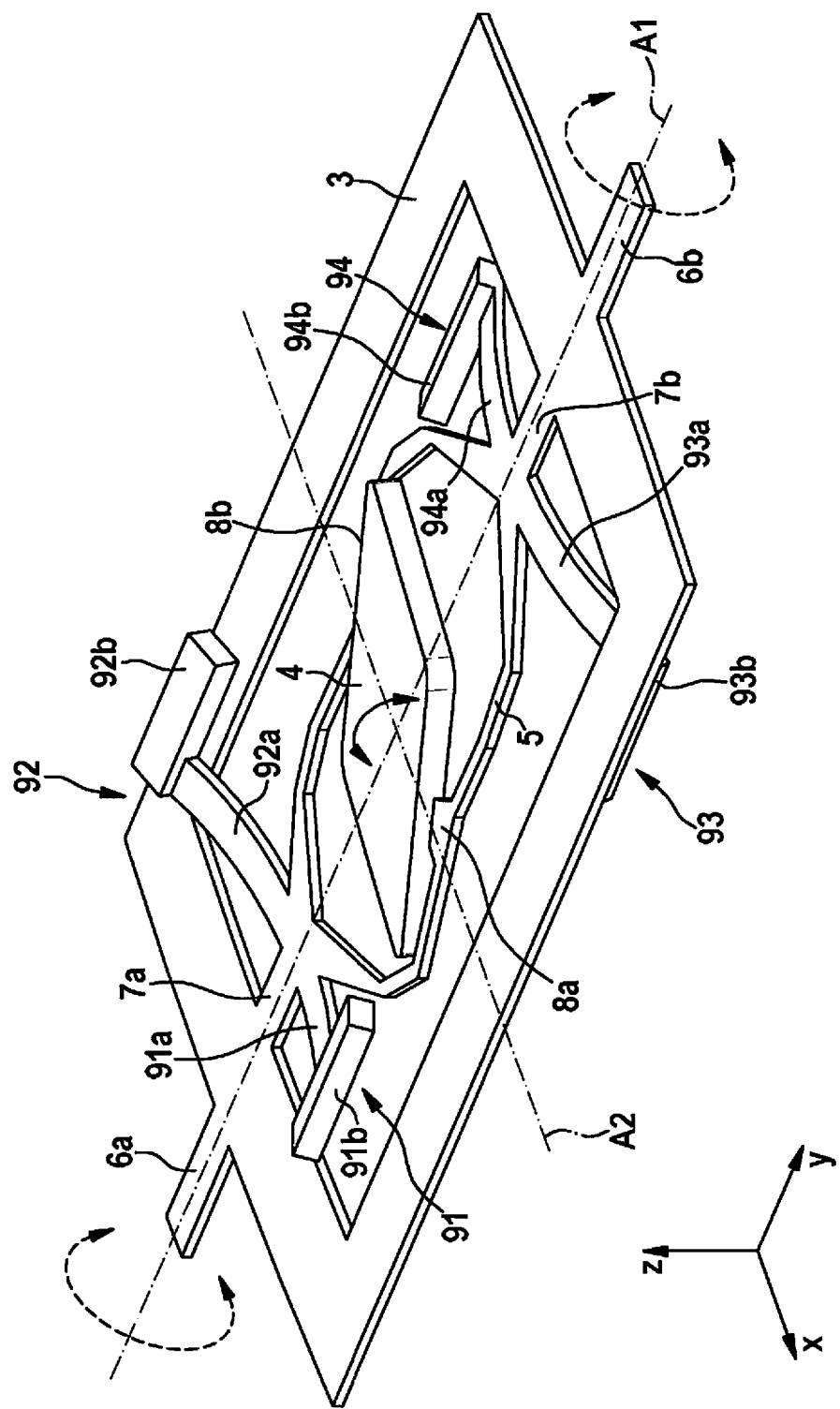
FIG. 2 shows a schematic oblique view of a detail of the micromirror device shown in FIG. 1, in order to explain the deflection of the oscillating plate.

An oblique view of micromirror device 1 is illustrated in FIG. 2, in which case substrate 2 is not shown. Through appropriate activation by the control device, first deflection elements 91, 92 are set into oscillation about second oscillating axis A2, relative to second deflection elements 93, 94. When first deflection elements 91, 92 are displaced along a z-axis perpendicular to an upper surface of substrate 2, that is, out of cavity 10, the diametrically opposed, second deflection elements 93, 94 are displaced contrarily to the z-axis, that is, into cavity 10. Thus, the control device is configured to displace first deflection elements 91, 92 in a direction opposite to second deflection elements 93, 94. The displacement of deflection elements 91 through 94 generates a rotary backswing of oscillating plate 4 about second oscillating axis A2.

In addition, outer frame element 3 and, therefore, oscillating plate 4, as well, may be rotated or deflected about first oscillating axis A1, which means that the micromirror of micromirror device 1 may be swiveled or deflected in two directions simultaneously.

Figure 3:
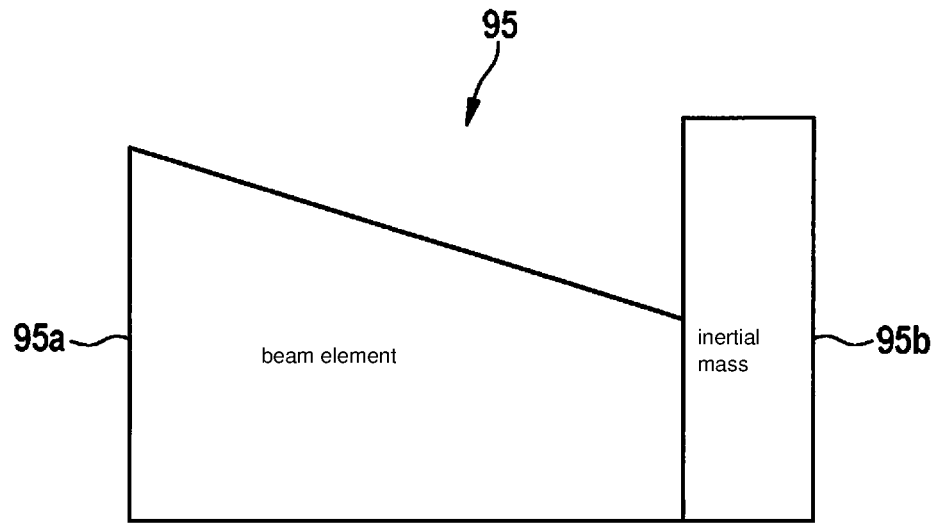
FIG. 3 shows a schematic plan view of a deflection element of a micromirror device, according to a specific embodiment of the present invention.

A deflection element 75 of a micromirror device 1 according to a further specific embodiment is illustrated in FIG. 3. Deflection element 95 includes a beam element 95a which tapers towards its outer end region and has an inertial mass 95b at this outer end region. Micromirror device 1 may include one or more of the deflection elements 95 shown, in particular, in place of the deflection elements 91 through 94 illustrated in FIG. 1. The number, layout and shape of deflection elements 91 through 94 is not limited to the specific embodiment shown in FIG. 1, which means that, in particular, more than four or also fewer than four deflection elements may be situated on inner frame element 5.

Figure 4:
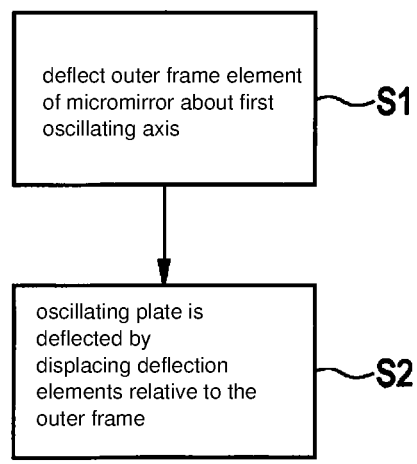
FIG. 4 shows a flow chart for explaining a method of operating a micromirror device according to a specific embodiment of the present invention.

A flow chart for explaining a method of operating a micromirror device 1 according to a specific embodiment of the present invention is illustrated in FIG. 4. In a first method step S1, outer frame element 3 of micromirror device 1 is deflected about first oscillating axis A1. The deflection may be carried out, in particular, with the aid of the control device described above.

In a second step S2, oscillating plate 4 is deflected by displacing deflection elements 91 through 94 relative to the outer frame element. The displacement of deflection elements 91 through 94 may be carried out, in turn, by the control device described above. Outer frame element 3 is preferably deflected at a first frequency, which is less than a second frequency, at which oscillating plate 4 is deflected.

What is claimed is:

1. A micromirror device, comprising:
    a substrate;
    an outer frame element, which is connected to the substrate along a first oscillating axis, using a first suspension device, and is deflectable about the first oscillating axis; an inner frame element, which is connected to the outer frame element along the first oscillating axis, using a second suspension device; and
    an oscillating plate, which includes a micromirror and is connected to the inner frame element along a second oscillating axis, using a third suspension device, the first oscillating axis being perpendicular to the second oscillating axis;
    wherein the inner frame element includes displaceable deflection elements, and the oscillating plate is deflectable by displacing the deflection elements relative to the outer frame element,
    wherein the deflection elements each include a beam element running parallelly to the second oscillating axis in an undeflected state, and an inertial mass positioned on the beam element, and
    wherein the beam elements taper towards their outer end region.

2. The micromirror device as recited in claim 1, wherein the deflection elements include first deflection elements and second deflection elements, the first deflection elements are positioned on the inner frame element symmetrically to the second oscillating axis with respect to the second deflection elements, and wherein by oppositely directed displacement of the first deflection elements relative to the second deflection elements, the oscillating plate may be set into oscillation about the second oscillating axis.

3. The micromirror device as recited in claim 1, wherein the substrate has a cavity, and the first suspension device has a first suspension element and a second suspension element, which connect the substrate to the outer frame element on opposite sides of the cavity, along the first oscillating axis.

4. The micromirror device as recited in claim 1, wherein the second suspension device has a third suspension element and a fourth suspension element, which connect the outer frame element to the inner frame element on opposite sides of the oscillating plate along the first oscillating axis.

5. The micromirror device as recited in claim 1, wherein the third suspension device has a fifth suspension element and a sixth suspension element, which connect the inner frame element to the oscillating plate on opposite sides of the oscillating plate, along the second oscillating axis.

6. The micromirror device as recited in claim 1, wherein the inertial mass is situated in an outer end region of the beam elements.

7. The micromirror device as recited in claim 1, wherein the deflection elements have at least one piezoelectric layer.

8. A method for operating a micromirror device, the micromirror device including a substrate, an outer frame element, which is connected to the substrate along a first oscillating axis, using a first suspension device, and is deflectable about the first oscillating axis, an inner frame element, which is connected to the outer frame element along the first oscillating axis, using a second suspension device, and an oscillating plate, which includes a micromirror and is connected to the inner frame element along a second oscillating axis, using a third suspension device, the first oscillating axis being perpendicular to the second oscillating axis, wherein the inner frame element includes displaceable deflection elements, and the oscillating plate is deflectable by displacing the deflection elements relative to the outer frame element, the method comprising:
    deflecting the outer frame element about the first oscillating axis; and
    deflecting the oscillating plate relative to the outer frame element by displacing the deflection elements,
    wherein the deflection elements each include a beam element running parallelly to the second oscillating axis in an undeflected state, and an inertial mass positioned on the beam element, and
    wherein the beam elements taper towards their outer end region.

* * * * *